US010623418B2

(12) United States Patent
Chen et al.

(10) Patent No.: US 10,623,418 B2
(45) Date of Patent: *Apr. 14, 2020

(54) INTERNET OF THINGS SECURITY APPLIANCE

(71) Applicant: INTERNATIONAL BUSINESS MACHINES CORPORATION, Armonk, NY (US)

(72) Inventors: KuoChun Chen, New Taipei (TW); Sheng-Tung Hsu, Taipei (TW); Jia-Sian Jhang, New Taipei (TW); Chun-Shuo Lin, Tainan (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,592

(22) Filed: Sep. 12, 2018

(65) Prior Publication Data
US 2019/0014132 A1 Jan. 10, 2019

Related U.S. Application Data

(63) Continuation of application No. 15/086,525, filed on Mar. 31, 2016, now Pat. No. 10,237,284.

(51) Int. Cl.
H04L 29/00 (2006.01)
H04L 29/06 (2006.01)

(52) U.S. Cl.
CPC ...... H04L 63/1408 (2013.01); H04L 63/1416 (2013.01); H04L 63/1441 (2013.01)

(58) Field of Classification Search
CPC ............. H04L 63/1408; H04L 63/1441; H04L 63/1416
See application file for complete search history.

(56) References Cited

U.S. PATENT DOCUMENTS 8,990,944 B1 * 3/2015 Singh ............... G06F 21/56 726/24
10,341,355 B1 * 7/2019 Niemoller ............. H04L 63/105
(Continued)

FOREIGN PATENT DOCUMENTS

WO 2014175721 A1 10/2014
WO 2015052512 A1 4/2015
WO 2015103338 A1 7/2015

OTHER PUBLICATIONS

Espadas et al., "A tenant-based resource allocation model for scaling Software-as-a-Service applications over cloud computing infrastructures", Future Generation Computer Systems, vol. 29, Issue 1, Jan. 2013, pp. 273-286 (Year: 2013).*
(Continued)

Primary Examiner — Morshed Mehedi
(74) Attorney, Agent, or Firm — Michael O'Keefe

(57) ABSTRACT

A method for implementing an Internet of Things security appliance is presented. The method may include intercepting a data packet sent from a server to a client computing device. The method may include performing a security check on the data packet using security modules. The method may include determining the data packet is not malicious based on the security check. The method may include determining a shadow tester to test the data packet based on a type associated with the client computing device. The method may include creating a virtualization environment of the client computing device using the shadow tester. The method may include analyzing behaviors associated with the data packet within the virtualization environment using detection modules. The method may include determining the behaviors do not violate a behavior policy associated with the client computing device. The method may include transmitting the data packet to the client computing device.

20 Claims, 8 Drawing Sheets

(56) References Cited

U.S. PATENT DOCUMENTS

| | | | | |
|---|---|---|---|---|
| 2008/0016339 | A1* | 1/2008 | Shukla | G06F 21/53 713/164 |
| 2009/0241190 | A1* | 9/2009 | Todd | G06F 21/53 726/23 |
| 2014/0096229 | A1 | 4/2014 | Burns et al. | |
| 2014/0223427 | A1* | 8/2014 | Bootland | G06F 8/61 718/1 |
| 2015/0248566 | A1 | 9/2015 | Scott-Nash et al. | |
| 2015/0312041 | A1 | 10/2015 | Choi | |
| 2016/0006766 | A1* | 1/2016 | Joo | H04L 63/145 726/1 |
| 2016/0014159 | A1* | 1/2016 | Schrecker | H04L 63/0869 726/1 |
| 2016/0301707 | A1* | 10/2016 | Cheng | H04L 63/1425 |
| 2016/0352685 | A1* | 12/2016 | Park | H04L 63/0245 |
| 2017/0289176 | A1 | 10/2017 | Chen et al. | |

OTHER PUBLICATIONS

Beck et al., "A simulation framework for Virtual Network Embedding algorithms", 2014 16th International Telecommunications Network Strategy and Planning Symposium (Networks), Date of Conference: Sep. 17-19 (Year: 2014).*

IBM: List of IBM Patents or Patent Applications Treated As Related (Appendix P), Oct. 29, 2018, pp. 1-2.

Alam et al., "SenaaS: An Event-driven Sensor Virtualization Approach for Internet of Things Cloud," IEEE International Conference on Networked Embedded Systems for Enterprise Applications (NESEA), 2010, 6 Pages.

Armmbed, "mbed OS," ARM mbed IoT Device Platform Software, p. 1-7, ARM Ltd., https://www.mbed.com/en/development/software/mbed-os/, Accessed on Mar. 23, 2016.

Clarice Technologies, "The Internet of Things: Hype and Potential," Demystifying the Internet of Things—Clarice Technologies Weblog, Mar. 6, 2014, p. 1-5, http://blog.claricetechnologies.com/2014/03/demystifying-the-internet-of-things/, Accessed on Mar. 23, 2016.

Cole, "The 8051 MCU: ARM's nemesis on the Internet of Things?," Embedded Electronics Blog, Jan. 6, 2014, p. 1-3, UBM, http://www.embedded.com/electronics-blogs/cole-bin/4426602/The-8051-MCU-ARM-s-nemesis-on-the-Internet-of-Things-, Accessed on Mar. 23, 2016.

Contiki, "Why Choose Contiki?," Contiki: The Open Source Operating System for the Internet of Things, p. 1-7, http://www.contiki-os.org/, Accessed on Mar. 23, 2016.

Flaherty, "Intel Tackles SoC With Quark," EE Times, Oct. 7, 2013, p. 1-2, UBM Electronics, http://www.eetimes.com/document.asp?doc_id=1319726&print=yes, Accessed on Mar. 23, 2016.

Garcia-Morchon et al., "Security Considerations in the IP-based Internet of Things," CoRE Internet-Draft, Sep. 11, 2013, p. 1-45, Version draft-garcia-core-security-06, https://tools.ietf.org/html/draft-garcia-core-security-06, Accessed on Mar. 23 2016.

Gusmeroli et al., "A Capability-Based Security Approach to Manage Access Control in the Internet of Things," Mathematical and Computer Modelling, Sep. 2013, p. 1, vol. 58, Issues 5-6, Elsevier Ltd., Abstract Only, http://www.sciencedirect.com/science/article/pii/S089571771300054X, Accessed on Mar. 29, 2016.

IOT-Lab, "Operating Systems," IoT-LAB Info, p. 1-2, FIT/IoT-LAB, https://www.iot-lab.info/operating-systems/, Accessed on Mar. 23, 2016.

Mell et al., "The NIST Definition of Cloud Computing," National Institute of Standards and Technology, Sep. 2011, p. 1-3, Special Publication 800-145.

Miessler, "HP Study Reveals 70 Percent of Internet of Things Devices Vulnerable to Attack," Hewlett Packard Enterprise Community, Jul. 29, 2014, p. 1-4, Hewlett Packard Enterprise Development LP, http://community.hpe.com/t5/blogs/blogarticleprintpage/blog-id/sws-22/article-id/1692, Accessed on Mar. 23, 2016.

Ning et al., "Cyberentity Security in the Internet of Things," Computer, Apr. 2013, p. 46-53, vol. 46, Issue 4, IEEE Computer Society.

OWASP, "OWASP Internet of Things Project," Open Web Application Security Project, Last Modified on Mar. 20, 2016, p. 1-2, https://www.owasp.org/index.php/OWASP_Internet_of_Things_Top_Ten_Project, Accessed on Mar. 23, 2016.

Poeter, "Bitdefender Unveils IoT Security Appliance," PCMag, Nov. 25, 2014, p. 1-2, http://www.pcmag.com/article2/0,2817,2472670,00.asp, Accessed on Mar. 23, 2016.

Proofpoint, "Proofpoint Uncovers Internet of Things (IoT) Cyberattack," Proofpoint Press Release, Jan. 16, 2014, 2 Pages, Proofpoint, Inc.

Roman et al., "Securing the Internet of Things," Computer, Sep. 2011, p. 51-58, vol. 44, Issue 9, IEEE Computer Society.

Rubens, "Internet of Things a Potential Security Disaster," eSecurity Planet, Sep. 4, 2014, p. 1-3, http://www.esecurityplanet.com/print/network-security/internet-of-things-a-potential-security-disaster.html, Accessed on Mar. 23, 2016.

Suciu et al., "Smart Cities Built on Resilient Cloud Computing and Secure Internet of Things," 19th International Conference on Control Systems and Computer Science (CSCS), 2013, p. 513-518, IEEE Computer Society.

* cited by examiner

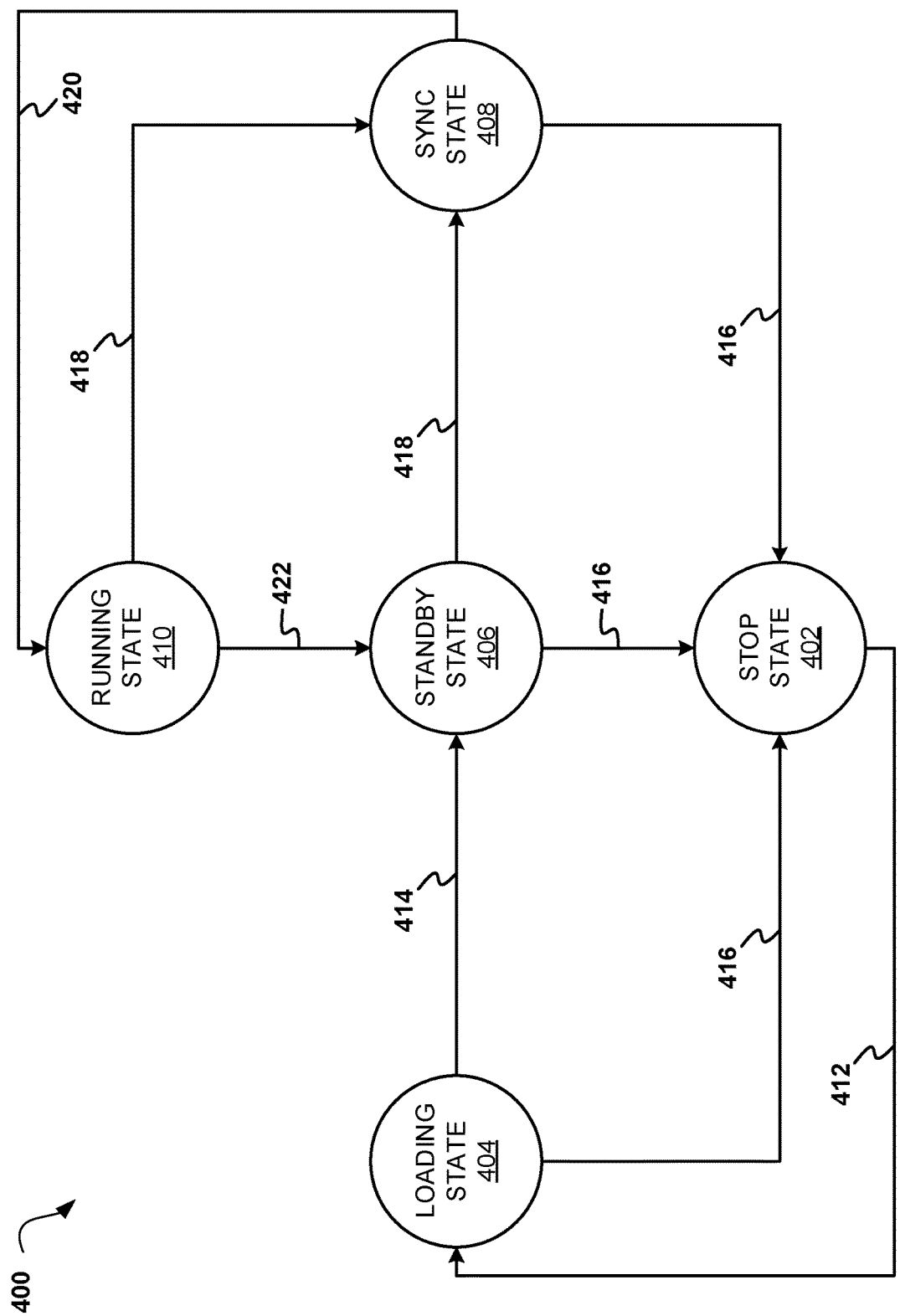

INTERNET OF THINGS SECURITY APPLIANCE

BACKGROUND

The present invention relates, generally, to the field of computing, and more particularly to information security.

The internet of things (IoT) relates to a network of physical devices, such as smartphones, vehicles, appliances, and other items with installed capabilities to allow for network connectivity. Due to the increase in physical devices with network connectivity capabilities, the IoT is growing rapidly. Due to such rapid growth, device security with the IoT is essential to protect user data and privacy.

SUMMARY

According to one embodiment, a method for an Internet of Things security appliance is provided. The method may include intercepting, by a processor, a data packet sent from a server to a client computing device. The method may also include performing a security check on the received data packet using a plurality of security modules. The method may further include determining the received data packet is not malicious based on the performed security check. The method may also include determining a shadow tester to test the determined data packet based on a type associated with the client computing device and based on determining the received data packet is not malicious. The method may further include creating a virtualization environment of the client computing device using the determined shadow tester and a virtualization module. The method may also include analyzing a plurality of behaviors associated with the determined data packet within the created virtualization environment using a plurality of detection modules. The method may further include determining the analyzed plurality of behaviors do not violate a behavior policy associated with the client computing device. The method may also include transmitting the determined data packet to the client computing device based on determining the analyzed plurality of behaviors do not violate the behavior policy.

According to another embodiment, a computer system for an Internet of Things security appliance is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include intercepting a data packet sent from a server to a client computing device. The method may also include performing a security check on the received data packet using a plurality of security modules. The method may further include determining the received data packet is not malicious based on the performed security check. The method may also include determining a shadow tester to test the determined data packet based on a type associated with the client computing device and based on determining the received data packet is not malicious. The method may further include creating a virtualization environment of the client computing device using the determined shadow tester and a virtualization module. The method may also include analyzing a plurality of behaviors associated with the determined data packet within the created virtualization environment using a plurality of detection modules. The method may further include determining the analyzed plurality of behaviors do not violate a behavior policy associated with the client computing device. The method may also include transmitting the determined data packet to the client computing device based on determining the analyzed plurality of behaviors do not violate the behavior policy.

According to yet another embodiment, a computer program product for an Internet of Things security appliance is provided. The computer program product may include one or more computer-readable storage devices and program instructions stored on at least one of the one or more tangible storage devices, the program instructions executable by a processor. The computer program product may include program instructions to intercept a data packet sent from a server to a client computing device. The computer program product may also include program instructions to perform a security check on the received data packet using a plurality of security modules. The computer program product may further include program instructions to determine the received data packet is not malicious based on the performed security check. The computer program product may also include program instructions to determine a shadow tester to test the determined data packet based on a type associated with the client computing device and based on determining the received data packet is not malicious. The computer program product may further include program instructions to create a virtualization environment of the client computing device using the determined shadow tester and a virtualization module. The computer program product may also include program instructions to analyze a plurality of behaviors associated with the determined data packet within the created virtualization environment using a plurality of detection modules. The computer program product may further include program instructions to determine the analyzed plurality of behaviors do not violate a behavior policy associated with the client computing device. The computer program product may also include program instructions to transmit the determined data packet to the client computing device based on determining the analyzed plurality of behaviors do not violate the behavior policy.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 4 is a functional block diagram illustrating state transitions of a shadow tester within an Internet of Things security appliance according to at least one embodiment;

DETAILED DESCRIPTION

Figure 1:
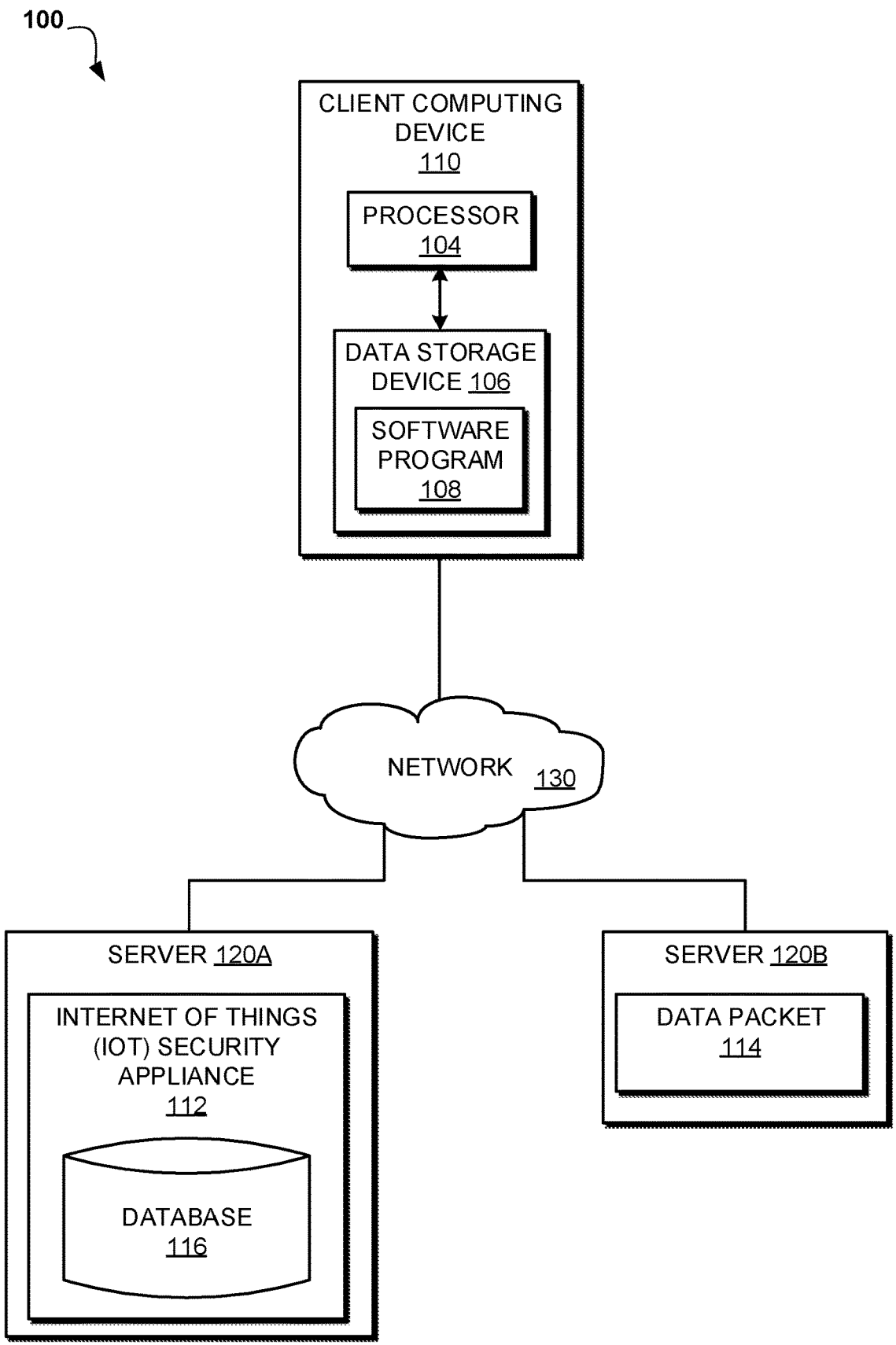
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to information security. The following described exemplary embodiments provide a system, method, and program product to, among other things, implement a security appliance solution as a gatekeeper to reduce or eliminate vulnerabilities experienced by Internet of Things (IoT) devices. Therefore, the present embodiment has the capacity to improve the technical field of information security by improving IoT device security.

As previously described, the IoT relates to a network of physical devices, such as smartphones, vehicles, appliances, and other items with installed capabilities to allow for network connectivity. Due to the increase in physical devices with network connectivity capabilities, the IoT is growing rapidly. Due to such rapid growth, device security within the IoT is essential to protect user data and privacy.

Security within the IoT is affected by a lack of ability to update, patch, or repair issues within the IoT. Furthermore, due to the nature of some IoT devices, various characteristics of IoT devices may vary from more powerful computing devices, such as desktops and servers. Additionally, some IoT devices may possess limited computing power and resources that may limit the IoT's ability to complete assigned tasks. For example, a smart light bulb may be an IoT device that is limited to a user remote control function allowing for changing bulb color and light intensity. Therefore, direct adoption of existing security solutions developed for more powerful computing devices may be difficult due to the limited resources and various operation control systems on some IoT devices. As such, it may be advantageous, among other things, to implement a system that utilizes a security framework with appliance architecture to provide a well-protected solution targeting IoT devices.

According to one embodiment, a security framework may include a built-in common IoT operating system, such as FreeRTOS™ (FreeRTOS and all FreeRTOS-based trademarks and logos are trademarks or registered trademarks of Real Time Engineers Ltd. and/or its affiliates) or Linux® (Linux and all Linux-based trademarks and logos are trademarks or registered trademarks of Linus Torvalds and/or his affiliates). The built-in common IoT operating system, such as an emulator, a simulator, or a virtual machine (VM), may allow users to add a unique proprietary operating system into the framework. Furthermore, the built-in common IoT operating system may convert the emulator, simulator, or VM being implemented into a finite-state machine used to monitor system behaviors, such as reading data from memory and tracking data flow. Additionally, users may follow interfaces to enable a proprietary operating system to report the state information. The security framework may also provide various virtualization technologies based on system needs and IoT device characteristics in order improve performance and efficiently utilize resources.

Since the IoT device may have low computing power, a security framework capable of simulating the IoT using a VM or emulator may be utilized. The VM or emulator may create a virtual environment substantially similar to the real IoT device. Therefore, a virtualization environment of the IoT device created using the VM or emulator may be tested to determine security risks to the real IoT device, such as malware, zero-day vulnerabilities, and data theft threats, using predefined detection modules. Therefore, data packets received by the security framework and executed by the VM or emulator may be inspected for suspicious behavior prior to actual execution of the received data packets on the real IoT device. Since the detection modules, such as information leakage detection and system failure detection, may be dynamically loaded, system administrators may be able to add more detection modules at any time and customize each VM or emulator with desired policies.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product that implement a security framework that utilizes a device, such as an emulator, simulator, or VM, as a built-in common IoT operating system. The built-in common IoT operating system may allow users to create proprietary operating systems to monitor data traffic and system performance in order to secure user information and efficiently utilize resources.

Referring to FIG. 1, an exemplary networked computer environment 100 is depicted, according to at least one embodiment. The networked computer environment 100 may include a client computing device 110 and a server 120A, 120B interconnected via a communication network 130. According to at least one implementation, the networked computer environment 100 may include a plurality of client computing devices 110, only one of which is shown for illustrative brevity. The networked computer environment 100 may also include a plurality of servers 120A, 120B, only two of which are shown for illustrative brevity.

The communication network 130 may include various types of communication networks, such as a wide area network (WAN), local area network (LAN), a telecommunication network, a wireless network, a public switched network and/or a satellite network. The communication network 130 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 110 may include a processor 104 and a data storage device 106 that is enabled to host and run a software program 108 and communicate with the server 120A, 120B via the communication network 130, in accordance with one embodiment of the invention. The client computing device 110 may be, for example, a mobile device, a telephone, a personal digital assistant, a netbook, a laptop computer, a tablet computer, a desktop computer, or any type of computing device capable of running a program and accessing a network. In at least one embodiment, the client computing device 110 may be an IoT device. As will be discussed with reference to FIG. 5, the client computing device 110 may include internal components 502a and external components 504a, respectively.

The server computer 120A, 120B may be a laptop computer, netbook computer, personal computer (PC), a desktop computer, or any programmable electronic device or any network of programmable electronic devices capable of hosting and running an IoT security appliance 112 and a data packet 114 and communicating with the client computing device 110 via the communication network 130, in accordance with embodiments of the invention. As will be discussed with reference to FIG. 5, the server computer 120A, 120B may include internal components 502b and external components 504b, respectively. The server 120A, 120B may also operate in a cloud computing service model, such as Software as a Service (SaaS), Platform as a Service (PaaS), or Infrastructure as a Service (IaaS). The server 120A, 120B may also be located in a cloud computing deployment model, such as a private cloud, community cloud, public cloud, or hybrid cloud.

According to the present embodiment, the IoT security appliance 112 may be a program capable of scanning an incoming data packet 114 through original signature-based and/or behavior-based patterns to detect data leaks. Furthermore, the IoT security appliance 112 may contain a data repository, such as database 116, to store existing IoT images received from a manufacturer or manually imported by a user. The IoT security appliance method is explained in further detail below with respect to FIGS. 3A-3B.

Figure 2:
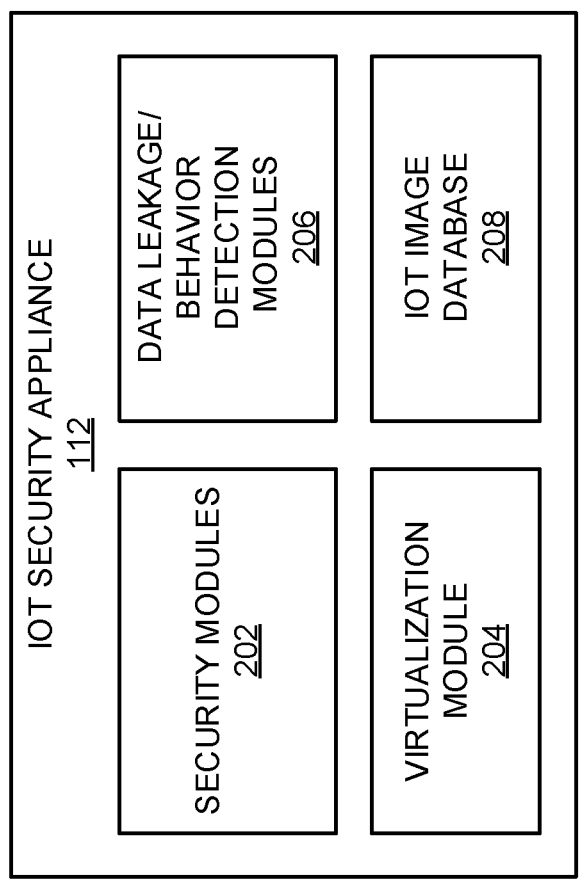
FIG. 2 is a functional block diagram of the elements of an IoT security appliance according to at least one embodiment.

Referring now to FIG. 2, a functional block diagram of the elements of an IoT security appliance 112 (FIG. 1) is depicted, according to at least one embodiment. The IoT security appliance 112 (FIG. 1) may include security modules 202, a virtualization module 204, data leakage/behavior detection modules 206, and an IoT image database 208. The security modules 202 may be capable of scanning a data packet 114 (FIG. 1) through known signature-based and/or behavior-based patterns. Furthermore, the security modules 202 may receive feedback results as an input from the data leakage/behavior detection modules 206 to transmit to a client computing device 110 (FIG. 1). The virtualization module 204 may be capable of receiving a data packet 114 (FIG. 1) scanned by the security modules 202 and simulating hardware (e.g. IoT devices) by isolating a shadow tester from a real environment. The shadow tester may be a device used to test a virtualization of an IoT device, such as client computing device 110 (FIG. 1), to determine whether any risks, such as zero-day attacks and deliberate data theft events, are present. Pseudo-data may be injected into a virtual environment to allow the shadow tester to operate within the virtual environment as if the virtual environment were a real environment. The detection modules 206 may be capable of collecting behavior information from the shadow tester and extracting shadow tester responses to a particular data packet 114 (FIG. 1). For example, the detection modules 206 may determine that the data within a data packet 114 (FIG. 1) exhibits behavior, when executed, consistent with the presence of malware. The responses to the malware by the shadow tester may then be extracted by the detection modules 206. Furthermore, the detection modules 206 may utilize known behavior monitoring techniques, such as information or data leakage detection and system failure detection. The extracted shadow tester responses may be utilized to determine whether any sensitive data leakage or system status abnormalities are present. The IoT image database 208 may be a data repository, such as database 116 (FIG. 1), that stores binary image files (e.g. .img files) used to create or recover shadow testers.

Figure 3A:
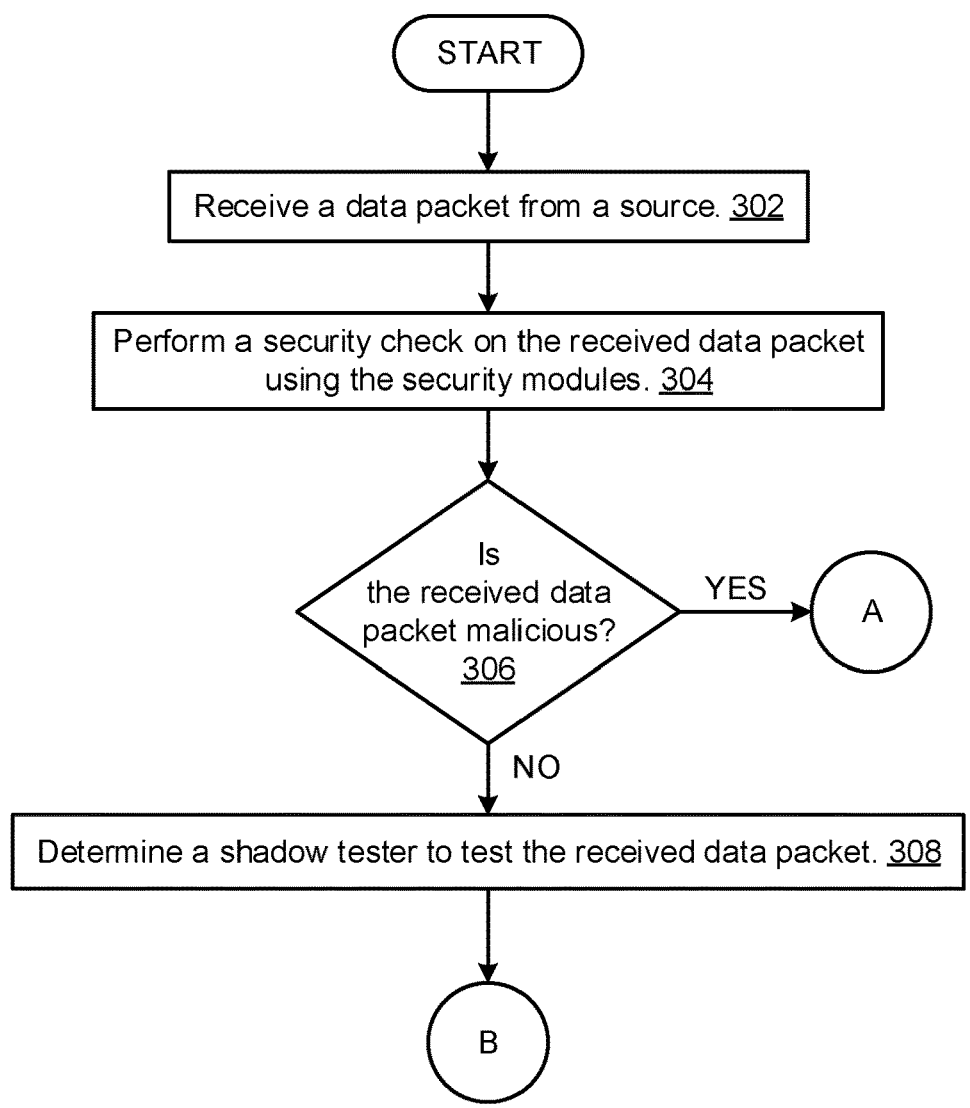
FIGS. 3A and 3B are an operational flowchart illustrating an Internet of Things security process according to at least one embodiment.
Figure 3B:
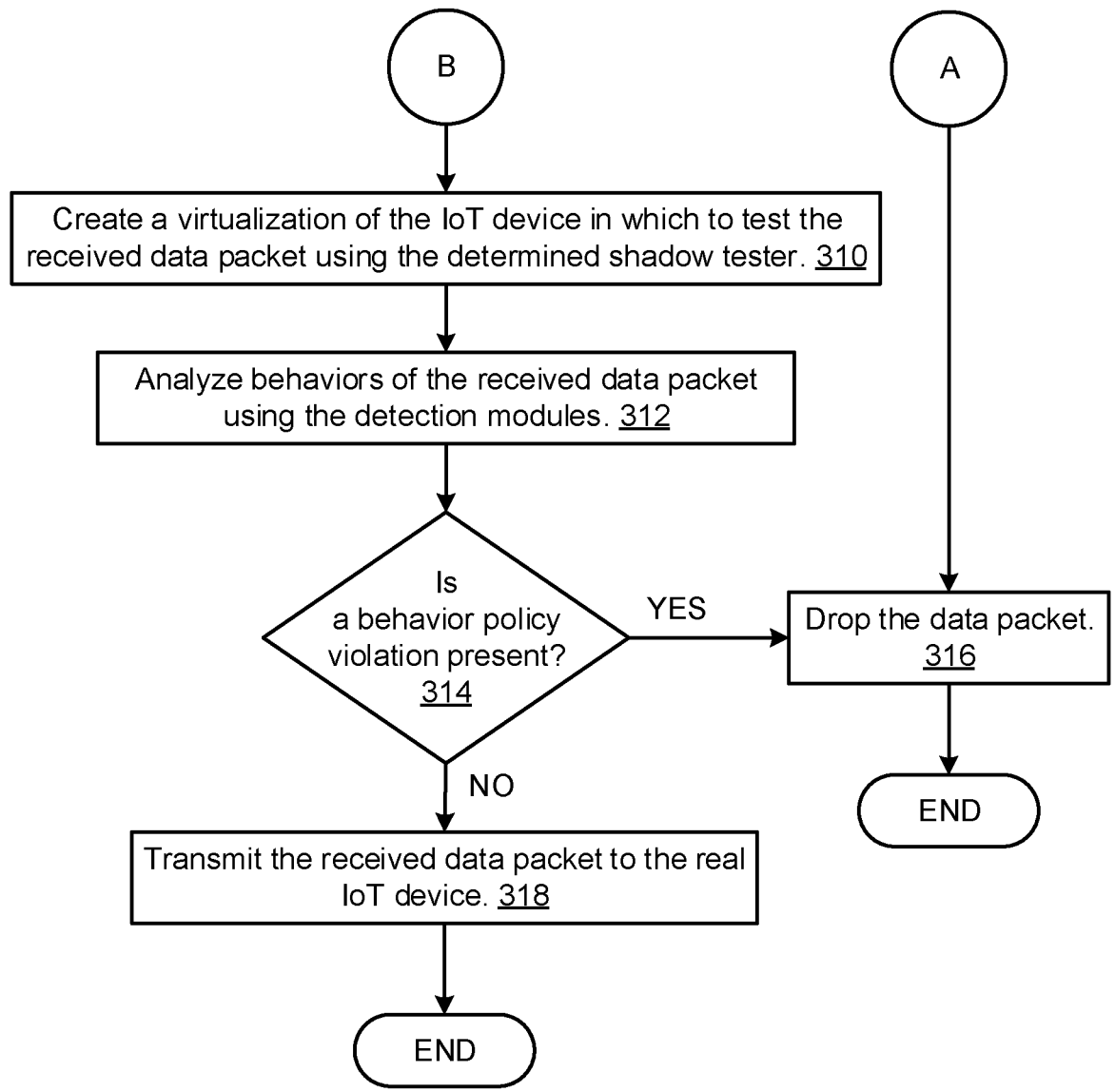

Referring now to FIGS. 3A and 3B, an operational flowchart illustrating an IoT security process 300 is depicted, according to at least one embodiment. In FIG. 3A, at 302, the IoT security appliance 112 (FIG. 1) receives a data packet 114 (FIG. 1) from a source, such as server 120B (FIG. 1). The data packet 114 (FIG. 1) may contain information needed by the client computing device 110 (FIG. 1) to perform a desired operation, such as a software upgrade. In order to complete the desired operation, the IoT security appliance 112 (FIG. 1) may receive the data packet 114 (FIG. 1) from a source, such as a server (e.g. 120B (FIG. 1)), in order to perform security testing of the data packet 114 (FIG. 1). For example, if a data packet 114 (FIG. 1) is needed to perform a software upgrade on the client computing device 110 (FIG. 1), the IoT security appliance 112 (FIG. 1) may receive the data packet 114 (FIG. 1) for security testing prior to the client computing device 110 (FIG. 1) receiving and installing the data contained within the data packet 114 (FIG. 1). In at least one embodiment, the data packet 114 (FIG. 1) may include multiple data packets analyzed, reviewed, and/or executed by the client computing device 110 (FIG. 1) in a real world environment and by the IoT security appliance 112 (FIG. 1) in a virtualized testing environment.

Then, at 304, the IoT security appliance 112 (FIG. 1) performs a security check on the data packet 114 (FIG. 1) using the security modules 202 (FIG. 2). Once the IoT security appliance 112 (FIG. 1) has received the data packet 114 (FIG. 1) from the server 120B (FIG. 1), the IoT security appliance 112 (FIG. 1) may perform a security check of the data packet 114 (FIG. 1). As previously described, the security modules 202 (FIG. 2) used to perform the security check may be capable of scanning the data packet 114 (FIG. 1) and comparing the scanned data packet 114 (FIG. 1) against existing signature-based and/or behavior-based patterns to identify security concerns in the data packet 114 (FIG. 1). For example, the security modules 202 (FIG. 2) may perform an antivirus and malware scan to determine whether the data packet 114 (FIG. 1) is malicious. In another embodiment, the security modules 202 (FIG. 2) may receive feedback results as an input from the data leakage/behavior detection modules 206 (FIG. 2) to transmit to a client computing device 110 (FIG. 1). The received feedback results may be a series of behaviors exhibited by the data within the data packet 114 (FIG. 1) once the IoT security appliance 112 (FIG. 1) has been processed by the detection modules 206 (FIG. 2).

Next, at 306, the IoT security appliance 112 (FIG. 1) determines whether the data packet 114 (FIG. 1) is malicious. According to one implementation, the IoT security process 300 may continue along the operational flowchart, if the data packet 114 (FIG. 1) is malicious. The data packet 114 (FIG. 1) may be malicious if the security scan performed by the security modules 202 (FIG. 2) of the IoT security appliance 112 (FIG. 1) identified the data packet 114 (FIG. 1) as being malware, such as spyware, or containing a virus. If the IoT security appliance 112 (FIG. 1) determines the data packet 114 (FIG. 1) is malicious (step 306, "Yes" branch), the IoT security appliance 112 (FIG. 1) may continue to step 316, depicted in FIG. 3B, to drop the data packet 114 (FIG. 1). If the IoT security appliance 112 (FIG. 1) determines the data packet 114 (FIG. 1) is not malicious (step 306, "No" branch), the IoT security appliance 112 (FIG. 1) may continue to step 308 to determine a shadow tester with which to test the received data packet 114 (FIG. 1).

Then, at 308, the IoT security appliance 112 (FIG. 1) determines a shadow tester with which to test the data packet 114 (FIG. 1). As previously described, the shadow tester may be a program used to test a virtual IoT device, such as simulation of client computing device 110 (FIG. 1), to determine whether any risks, such as zero-day attacks and deliberate data theft events, are present. To fulfill different requirements for various types of IoT devices, the IoT security appliance 112 (FIG. 1) may utilize either a VM-based shadow tester or a container-based shadow tester depending on the type of the IoT device. A VM-based shadow tester may be implemented to simulate the behavior of the IoT device with complete VM images provided from the manufacturer or the customer. The images, or image files, utilized by the VM-based shadow tester may be gathered from a data repository, such as database 116 (FIG. 1), within the IoT security appliance 112 (FIG. 1). The container-based shadow tester may implement an emulator, rather than an image, designed for development testing to simulate the behavior of the IoT device. In order to maintain system performance and ensure the loading of data to images, the emulator utilized by the container-based shadow tester may be executed on a container or a VM.

Referring now to FIG. 3B, at 310, the IoT security appliance 112 (FIG. 1) creates a virtualization of the IoT device in which to test the data packet 114 (FIG. 1) using the determined shadow tester and the virtualization module 204 (FIG. 2). Once the IoT security appliance 112 (FIG. 1) determines whether to use a VM-based shadow tester or a container-based shadow tester, the IoT security appliance 112 (FIG. 1) may create a virtualization environment on which to test the data packet 114 (FIG. 1) using the determined shadow tester and the virtualization module 204 (FIG. 2). Once the virtualization is created, the determined shadow tester may be capable of identifying whether the data packet 114 (FIG. 1) exposes the IoT device to risks, such as deliberate attempts to steal data or zero-day vulnerabilities.

Next, at 312, the IoT security appliance 112 (FIG. 1) analyzes behaviors of the data packet 114 (FIG. 1) using data leakage/behavior detection modules 206 (FIG. 2). Once the virtualization has been created by the determined shadow tester, the IoT security appliance 112 (FIG. 1) may execute the data packet 114 (FIG. 1) within the virtualization environment and monitor the behaviors of the data within the data packet 114 (FIG. 1) using detection modules 206 (FIG. 2) as if the data were being processed by the IoT device. As previously described, the detection modules 206 (FIG. 2) may be capable of collecting behavior information from the shadow tester and extracting shadow tester responses to a particular data packet 114 (FIG. 1). The detection modules 206 (FIG. 2) may utilize behavior monitoring techniques, such as information or data leakage detection and system failure detection. However, in order to inspect the behavior of the data packet 114 (FIG. 1) and check the system status of an IoT image, the IoT security appliance 112 (FIG. 1) may require monitoring permissions for the IoT image. To grant such permissions, the IoT security appliance 112 (FIG. 1) may utilize different levels of monitoring techniques, such as full support, support through customized scripts, event-based notification from the emulator, and no support, based on the varying level of security or management support available for a given IoT device.

If the IoT device fully supports monitoring by the IoT security appliance 112 (FIG. 1), the image or emulator used by the determined shadow tester may implement a web-based protocol with specific properties to completely adapt the protection techniques. The specific properties may include triggering an application programming interface (API) by the host, receiving an input key, and returning a data string that represents the system time and the hash based on the size and binary of major system components, the system status, and the given input key. Additionally, the system status may include the status of an important daemon, a process, or an operating system.

If the IoT device supports monitoring by the IoT security appliance 112 (FIG. 1) through customized scripts, a user may be required to develop the customized scripts. For Linux-based images that accept the running of scripts, the host may be capable of running scripts to check for risks.

However, if the IoT device supports event-based notification from an emulator utilized by the IoT security appliance 112 (FIG. 1), the manufacturer may provide a customized build with an event handler to notify the host about system changes through a web-based API. The handler function may be triggered when sensitive files, such as init.conf files, are modified, a system failure occurs, or regular system checks fail.

In other circumstances, if the IoT device does not provide support for monitoring by the IoT security appliance 112 (FIG. 1), the IoT security appliance 112 (FIG. 1) may only be capable of providing a hypervisor memory dump to analyze a variety of critical flags.

Then, at 314, the IoT security appliance 112 (FIG. 1) determines whether a violation of the behavior policy is detected. According to one implementation, the IoT security process 300 may continue along the operational flowchart, if a violation of the behavior policy is detected. A behavior policy may relate to the circumstances under which performance of an IoT device executing a data packet 114 (FIG. 1) is acceptable. For example, the behavior policy may establish the requirement that the data packet 114 (FIG. 1) does not contain any malware and the IoT device continues to perform at a user-defined threshold performance level. A violation of the behavior policy may be detected by the IoT security appliance 112 (FIG. 1) when IoT device fails to meet the preconfigured circumstances established within the behavior policy. For example, the detection modules 206 (FIG. 2) may detect a system risk, such as information data leakage or a system failure, while analyzing the behaviors of the virtualization environment of the IoT device. If the IoT security appliance 112 (FIG. 1) determines a violation of the behavior policy is detected (step 314, "Yes" branch), the IoT security appliance 112 (FIG. 1) may continue to step 316 to drop the data packet 114 (FIG. 1). If the IoT security appliance 112 (FIG. 1) determines a violation of the behavior policy is not detected (step 314, "No" branch), the IoT security appliance 112 (FIG. 1) may continue to step 318 to transmit the received data packet 114 (FIG. 1) to the real IoT device.

At 316, if the IoT security appliance 112 (FIG. 1) determines the data packet 114 (FIG. 1) is either malicious based on a security check performed by the security modules 202 (FIG. 2) at 306 or exhibits behavior in violation of the behavior policy as detected by detection modules 206 (FIG. 2) at 314, the IoT security appliance 112 (FIG. 1) drops the malicious or policy violating data packet 114 (FIG. 1). Dropping the data packet 114 (FIG. 1) may include either deleting or abandoning the data packet 114 (FIG. 1) by the IoT security appliance 112 (FIG. 1). If the IoT security appliance 112 (FIG. 1) drops the data packet 114 (FIG. 1), then the IoT security appliance 112 (FIG. 1) may not transmit the data packet 114 (FIG. 1) to the real IoT device and the IoT security process 300 may terminate.

At 318, if the IoT security appliance 112 (FIG. 1) determines the behavior policy is not violated, the IoT security appliance 112 (FIG. 1) transmits the data packet 114 (FIG. 1) to the client computing device 110 (FIG. 1). Through the various scans performed by the IoT security appliance 112

(FIG. 1) on the data packet 114 (FIG. 1), the IoT security appliance 112 (FIG. 1) may determine the data packet 114 (FIG. 1) is neither malicious based on a security check performed by the security modules 202 (FIG. 2) nor exhibits behavior in violation of the behavior policy as detected by detection modules 206 (FIG. 2). As such, IoT security appliance 112 (FIG. 1) may transmit the data packet 114 (FIG. 1) to the real IoT device for execution. Once the IoT security appliance 112 (FIG. 1) has transmitted the data packet 114 (FIG. 1) to the real IoT device, the IoT security process 300 may terminate.

Referring now to FIG. 4, a functional block diagram of state transitions 400 of a shadow tester within an IoT security appliance 112 (FIG. 1) is depicted, in accordance with one embodiment of the present invention. As previously described, the shadow tester utilized by the IoT security appliance 112 (FIG. 1) may create a virtual environment of the IoT device in order to test the data within a received data packet 114 (FIG. 1). When performing functions to create and test the data packet 114 (FIG. 1) in the virtual environment, the shadow tester may operate under various states, such as a stop state 402, a loading state 404, a standby state 406, a synchronous state 408 (sync state), and a running state 410. The stop state 402 may relate to the state of the IoT security appliance 112 (FIG. 1) when no image is loaded within the shadow tester. The loading state 404 may relate to the state of the IoT security appliance 112 (FIG. 1) when the shadow tester attempts to fetch, load, or activate a target device image. The standby state 406 may relate to the state of the IoT security appliance 112 (FIG. 1) when the shadow tester is ready for execution. The sync state 408 may relate to the state of the IoT security appliance 112 (FIG. 1) when the shadow tester is synchronizing configurations with the target device. For example, once the image for the IoT device is loaded and standing by for execution, the shadow tester may synchronize the current state of the virtual environment with the current state of the real IoT device so a more accurate virtualization may be performed. The running state 410 may relate to the state of the IoT security appliance 112 (FIG. 1) when the shadow tester is acting as the real-time simulator of the target device. During the running state 410, all external internet operation commands, such as internet search commands, may be executed by the shadow tester prior to the target device executing the same commands. Only the secured commands, as determined by a successful test of the shadow tester, may be delivered to the target device for execution.

Additionally, the IoT security appliance 112 (FIG. 1) may utilize various actions, such as a creation action 412, a ready action 414, destroy action 416, a synchronize action 418 (sync action), a run action 420, and a wait action 422, depending on the states 402-410 the IoT security appliance 112 (FIG. 1) is transitioning between. The creation action 412, or a loading action, may occur when the IoT security appliance 112 (FIG. 1) transitions between the stop state 402 and the loading state 404. The creation action 412 may relate to the shadow tester creating, fetching, loading, or activating a target device image in preparation to enter the loading state 404. The ready action 414 may occur when the IoT security appliance 112 (FIG. 1) transitions between the loading state 404 and the standby state 406. The ready action may relate to the shadow tester being prepared to execute under the standby state 406. The destroy action 416 may occur when the IoT security appliance 112 (FIG. 1) transitions between the loading state 404, the standby state 406, or the sync state 408 and the stop state 402. The destroy action 416 may relate to the shadow tester removing, dropping, or deleting the loaded device image in preparation to enter the stop state 402. The sync action 418 may occur when the IoT security appliance 112 (FIG. 1) transitions from the standby state 406 or the running state 410 and the sync state 408. The sync action 418 may relate to when the shadow tester synchronizes configurations with the target device to allow for an accurate test. The run action 420 may occur when the IoT security appliance 112 (FIG. 1) transitions between the sync state 408 and the running state 410. The run action 420 may relate to the shadow tester performing a simulation of the target device to identify security risks or violations of the behavior policy. The wait action 422 may occur when the IoT security appliance 112 (FIG. 1) transitions between the running state 410 and the standby state 406. The wait action may relate to the shadow tester pausing the performance of the simulation that occurs in the running state 410.

It may be appreciated that FIGS. 3A, 3B and FIG. 4 provide only an illustration of one implementation and do not imply any limitations with regard to how different embodiments may be implemented. Many modifications to the depicted environments may be made based on design and implementation requirements.

Figure 5:
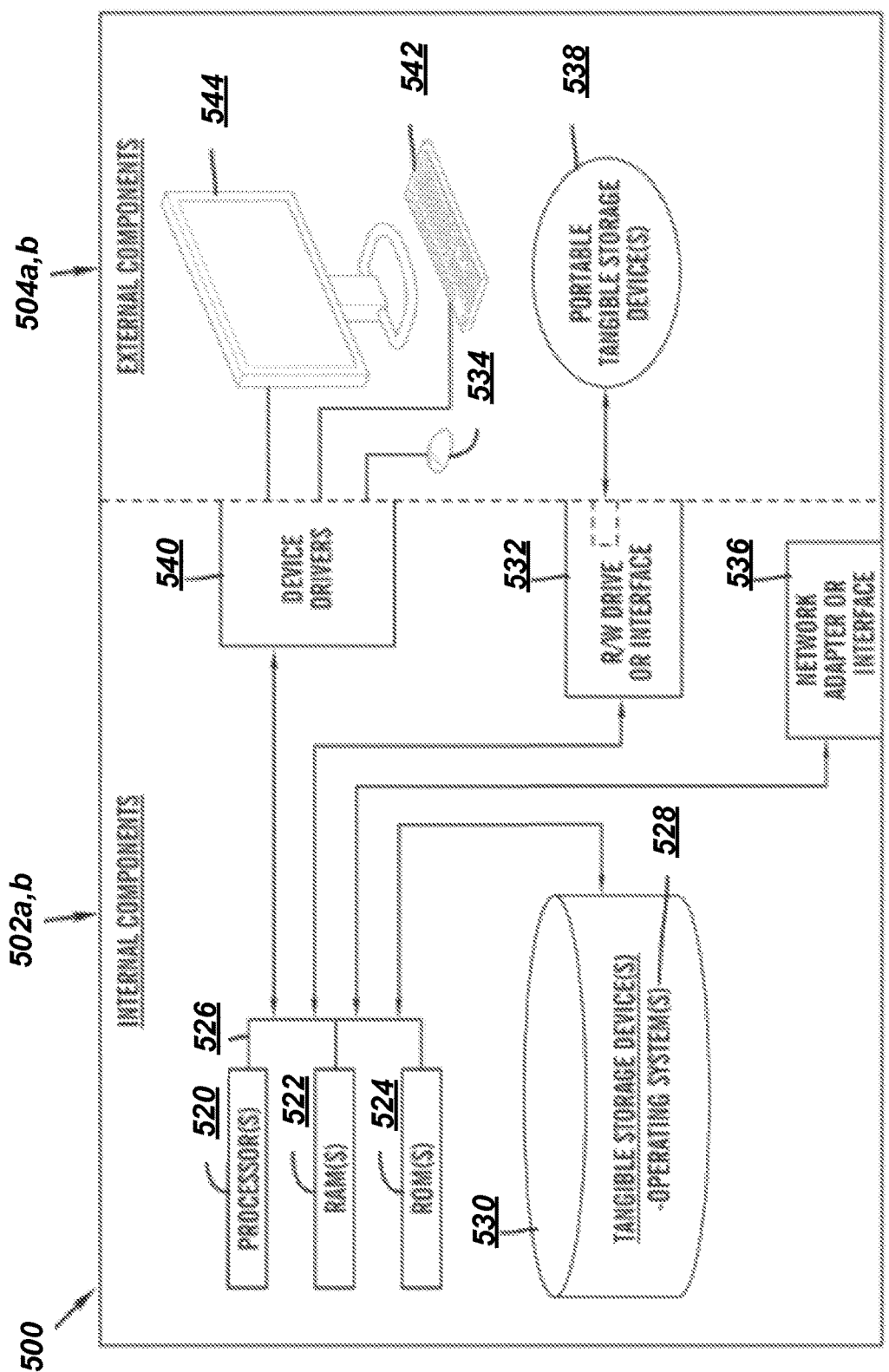
FIG. 5 is a block diagram of internal and external components of computers and servers depicted in FIG. 1 according to at least one embodiment.

FIG. 5 is a block diagram 500 of internal and external components of the client computing device 110 and the server 120A, 120B depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 110 (FIG. 1) and the server 120A, 120B (FIG. 1) may include respective sets of internal components 502 a,b and external components 504 a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 (FIG. 1) in the client computing device 110 (FIG. 1) and the IoT security appliance 112 (FIG. 1) in the server 120A (FIG. 1) are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the IoT security appliance 112 (FIG. 1), can be stored on one or more of the respective portable computer-readable tangible storage devices 538, read via the respective R/W drive or interface 532, and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The software program 108 (FIG. 1) in the client computing device 110 (FIG. 1) and the IoT security appliance 112 (FIG. 1) in the server 120A (FIG. 1) can be downloaded to the client computing device 110 (FIG. 1) and the server 120A (FIG. 1) from an external computer via a network (for example, the Internet, a local area network or other, wide area network) and respective network adapters or interfaces 536. From the network adapters or interfaces 536, the software program 108 (FIG. 1) in the client computing device 110 (FIG. 1) and the IoT security appliance 112 (FIG. 1) in the server 120A (FIG. 1) are loaded into the respective hard drive 530. The network may comprise copper wires, optical fibers, wireless transmission, routers, firewalls, switches, gateway computers and/or edge servers.

Each of the sets of external components 504 a,b can include a computer display monitor 544, a keyboard 542, and a computer mouse 534. External components 504 a,b can also include touch screens, virtual keyboards, touch pads, pointing devices, and other human interface devices. Each of the sets of internal components 502 a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
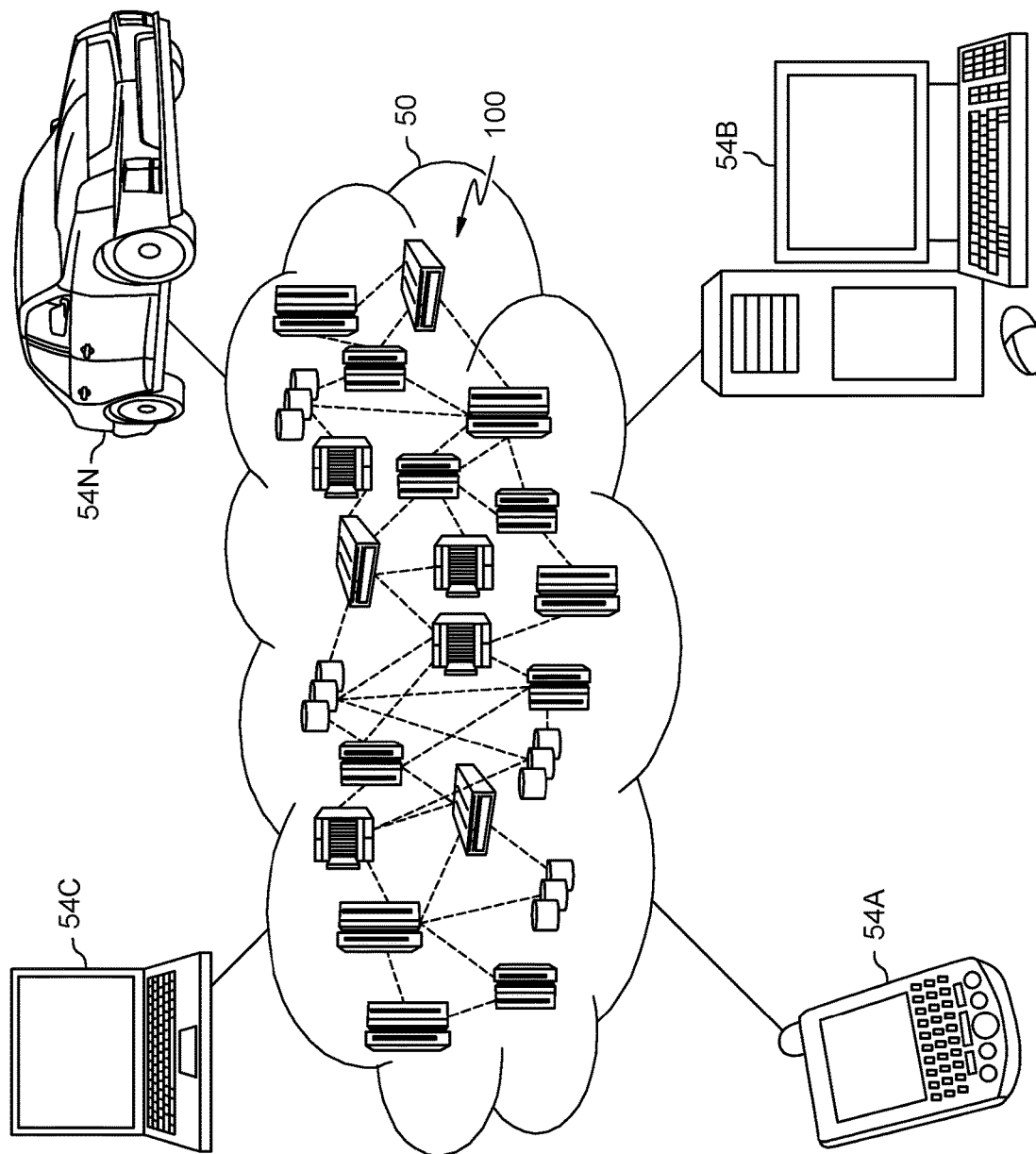
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
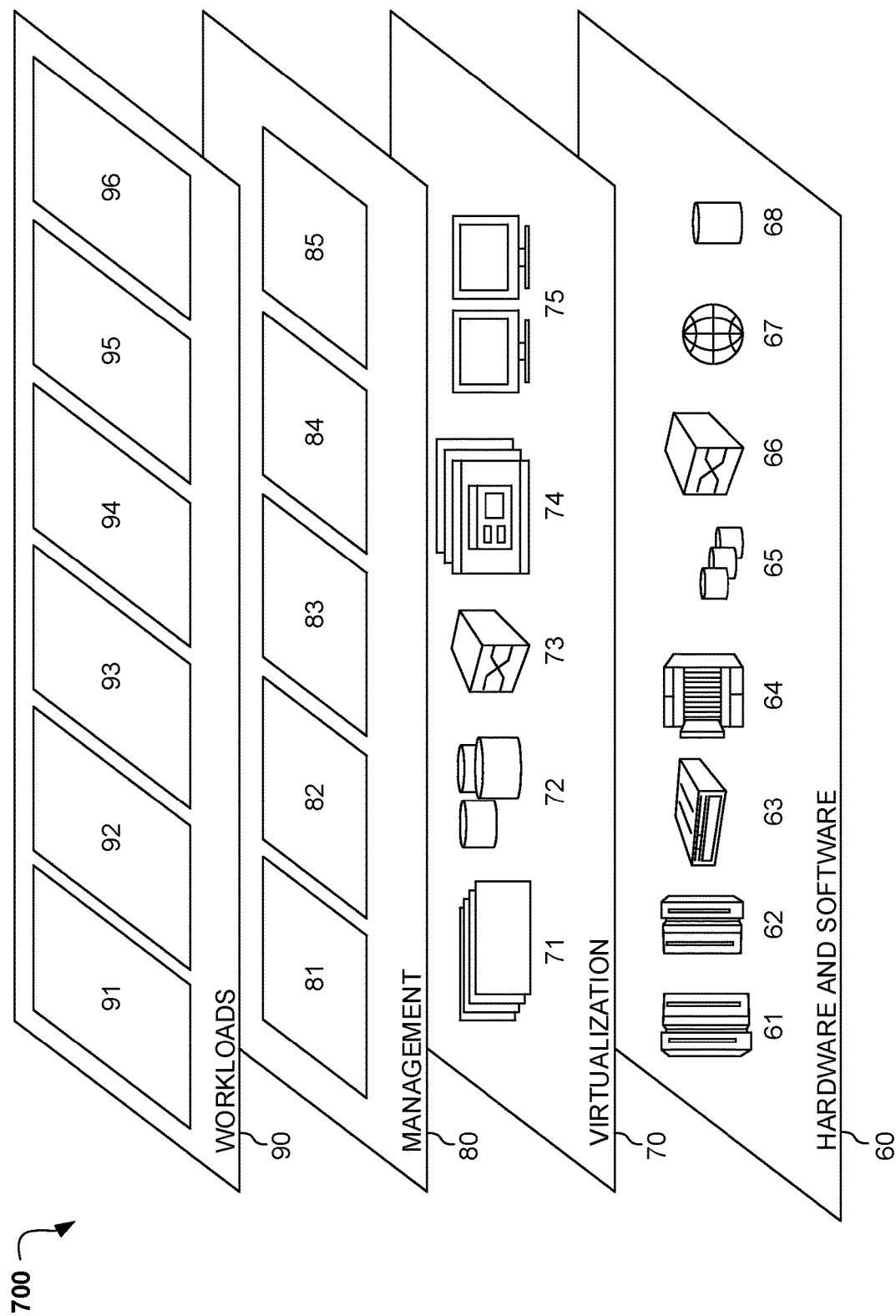
FIG. 7 depicts abstraction model layers according to an embodiment of the present invention.

Referring now to FIG. 7 a set of functional abstraction layers 700 provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and IoT security appliance testing 96. IoT security appliance testing 96 may relate to creating a simulation environment using a VM or an emulator to perform security checks in order to identify risks and behavior policy violations of received data packets prior to executing the data packets in a real IoT device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for an Internet of Things security appliance, the method comprising:
   determining an intercepted data packet is not malicious based on a security check;
   determining a shadow tester to test the determined data packet based on a type associated with the client computing device and based on determining the received data packet is not malicious;
   creating a virtualization environment of the client computing device using the determined shadow tester and a virtualization module that improves performance and efficiency in utilizing resources; and
   in response to determining a plurality of behaviors associated with the determined data packet do not violate a behavior policy associated with the client computing device, transmitting the determined data packet to the client computing device.

2. The method of claim 1, wherein the determined shadow tester is at least one of a virtual machine-based shadow tester and a container-based shadow tester.

3. The method of claim 1, wherein analyzing the plurality of behaviors comprises detecting a plurality of data leakage from the determined data packet.

4. The method of claim 1, wherein analyzing the plurality of behaviors comprises obtaining a plurality of monitoring techniques based on a security level or a plurality of management support available for the client computing device, and wherein the plurality of monitoring techniques comprises at least one of a full support technique, a customized script-based support technique, and a non-supported technique.

5. The method of claim 1, further comprising:
   deleting the determined data packet based on determining the analyzed plurality of behaviors violates the behavior policy associated with the client computing device.

6. The method of claim 1, further comprising:
   deleting the received data packet based on determining the received data packet is malicious based on the security check, and wherein the security check determines the received data packet is malicious based on the received data packet containing at least one of an item of malware and a virus.

7. The method of claim 1, wherein the plurality of security modules utilize a behavior-based pattern when performing the security check on the received data packet.

8. A computer system for an Internet of Things security appliance, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
determining an intercepted data packet is not malicious based on a security check;
    determining a shadow tester to test the determined data packet based on a type associated with the client computing device and based on determining the received data packet is not malicious;
    creating a virtualization environment of the client computing device using the determined shadow tester and a virtualization module that improves performance and efficiency in utilizing resources; and
    in response to determining a plurality of behaviors associated with the determined data packet do not violate a behavior policy associated with the client computing device, transmitting the determined data packet to the client computing device.

9. The computer system of claim 8, wherein the determined shadow tester is at least one of a virtual machine-based shadow tester and a container-based shadow tester.

10. The computer system of claim 8, wherein analyzing the plurality of behaviors comprises detecting a plurality of data leakage from the determined data packet.

11. The computer system of claim 8, wherein analyzing the plurality of behaviors comprises obtaining a plurality of monitoring techniques based on a security level or a plurality of management support available for the client computing device, and wherein the plurality of monitoring techniques comprises at least one of a full support technique, a customized script-based support technique, and a non-supported technique.

12. The computer system of claim 8, further comprising:
deleting the determined data packet based on determining the analyzed plurality of behaviors violates the behavior policy associated with the client computing device.

13. The computer system of claim 8, further comprising:
deleting the received data packet based on determining the received data packet is malicious based on the security check, and wherein the security check determines the received data packet is malicious based on the received data packet containing at least one of an item of malware and a virus.

14. The computer system of claim 8, wherein the plurality of security modules utilize a behavior-based pattern when performing the security check on the received data packet.

15. A computer program product for an Internet of Things security appliance, the computer program product comprising:
one or more computer-readable non-transitory tangible storage media and program instructions stored on at least one of the one or more non-transitory tangible storage media, the program instructions executable by a processor capable of performing a method, the method comprising:
determining an intercepted data packet is not malicious based on a security check;
    determining a shadow tester to test the determined data packet based on a type associated with the client computing device and based on determining the received data packet is not malicious;
    creating a virtualization environment of the client computing device using the determined shadow tester and a virtualization module that improves performance and efficiency in utilizing resources; and
    in response to determining a plurality of behaviors associated with the determined data packet do not violate a behavior policy associated with the client computing device, transmitting the determined data packet to the client computing device.

16. The computer program product of claim 15, wherein the determined shadow tester is at least one of a virtual machine-based shadow tester and a container-based shadow tester.

17. The computer program product of claim 15, wherein analyzing the plurality of behaviors comprises detecting a plurality of data leakage from the determined data packet.

18. The computer program product of claim 15, wherein analyzing the plurality of behaviors comprises obtaining a plurality of monitoring techniques based on a security level or a plurality of management support available for the client computing device, and wherein the plurality of monitoring techniques comprises at least one of a full support technique, a customized script-based support technique, and a non-supported technique.

19. The computer program product of claim 15, further comprising:
program instructions to delete the determined data packet based on determining the analyzed plurality of behaviors violates the behavior policy associated with the client computing device.

20. The computer program product of claim 15, further comprising:
program instructions to delete the received data packet based on determining the received data packet is malicious based on the security check, and wherein the security check determines the received data packet is malicious based on the received data packet containing at least one of an item of malware and a virus.

\* \* \* \* \*